United States Patent
Grueneklee et al.

(10) Patent No.: US 7,273,247 B2
(45) Date of Patent: Sep. 25, 2007

(54) SUPPORT STRUCTURE FOR VEHICLES, MADE FROM HOLLOW STEEL SECTIONS

(75) Inventors: Axel Grueneklee, Duisburg (DE);
Lothar Patberg, Aachen (DE);
Dariush Philipp, Krefeld (DE)

(73) Assignee: ThyssenKrupp Stahl AG (DE)

( * ) Notice: Subject to any disclaimer, the term of this patent is extended or adjusted under 35 U.S.C. 154(b) by 62 days.

(21) Appl. No.: 10/505,518

(22) PCT Filed: Feb. 15, 2003

(86) PCT No.: PCT/EP03/01530

§ 371 (c)(1),
(2), (4) Date: Feb. 25, 2005

(87) PCT Pub. No.: WO03/072421

PCT Pub. Date: Sep. 4, 2003

(65) Prior Publication Data

US 2005/0151394 A1    Jul. 14, 2005

(30) Foreign Application Priority Data

Feb. 28, 2002 (DE) ............................ 102 08 778

(51) Int. Cl.
*B62D 25/08* (2006.01)

(52) U.S. Cl. .................................. 296/205; 296/204

(58) Field of Classification Search ............... 296/204, 296/203.01, 203.02, 187.09, 205
See application file for complete search history.

(56) References Cited

U.S. PATENT DOCUMENTS 4,986,597 A    1/1991    Clausen

FOREIGN PATENT DOCUMENTS

DE          41 39 292 A1    6/1992
GB             529631        11/1940

*Primary Examiner*—Dennis H. Pedder
*Assistant Examiner*—Melissa Black
(74) *Attorney, Agent, or Firm*—Proskauer Rose LLP

(57) ABSTRACT

The invention relates to a support structure for vehicles, made from a longitudinal member (1) comprising at least two interconnected hollow sections (10, 11). One of the hollow sections continues in the direction of the bumper (5). In the case of a crash with low-speed impact, there is a targeted deformation of the single hollow section (10c), which makes it possible to carry out repairs economically. In the case of a higher-speed impact, the more rigid support structure of the double hollow section for protecting passengers comes into play. Since in this design the impact absorber, which is usually arranged between the longitudinal member and the bumper, can be done without, there is also a reduction in the number of components required, and thus in the overall weight.

13 Claims, 9 Drawing Sheets

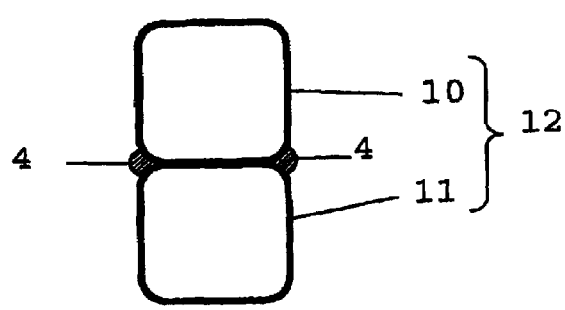
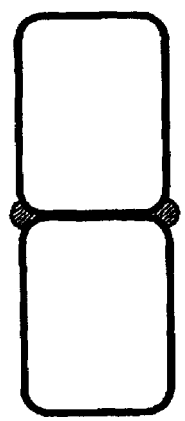
Fig. 8a
Fig. 8b
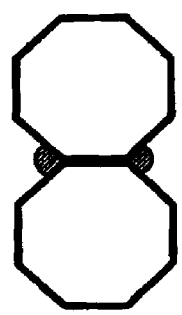
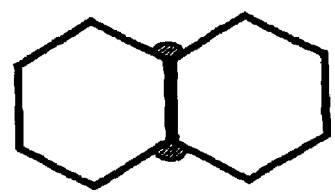
Fig. 8c
Fig. 8d
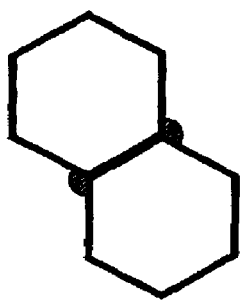
Fig. 8e

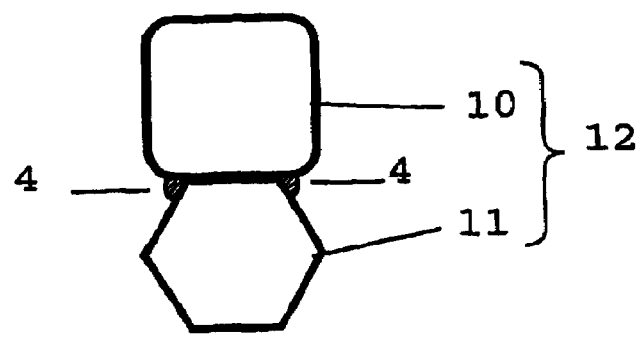
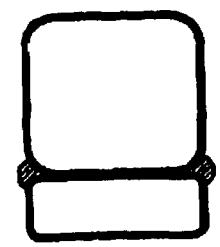
Fig. 9a
Fig. 9b
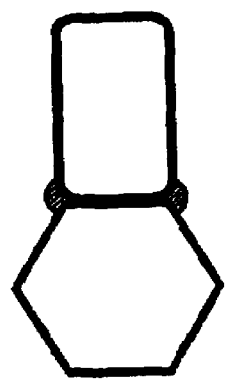
Fig. 9c

SUPPORT STRUCTURE FOR VEHICLES, MADE FROM HOLLOW STEEL SECTIONS

BACKGROUND OF THE INVENTION

The invention relates to a support structure for vehicles, made from hollow steel sections, comprising a longitudinal member made from at least two hollow sections which are interconnected in parallel, wherein said hollow sections, in front of the support structure of the passenger compartment, bifurcate into a first hollow section supported by the lateral sill, and a second hollow section supported by other parts of the support structure.

Various designs of support structures of this type are known. U.S. Pat. No. 4,986,597 describes a design made from extruded aluminium sections comprising a longitudinal member which comprises two hollow sections, wherein the hollow sections reach both into the sill region and into the A-pillar of the support structure of the passenger compartment. A second structural member reaches from the A-pillar to the sill region so that overall, the longitudinal member, the A-pillar and the sill comprise a design featuring a double structural member. With such a design, a favourable force progression within a support structure is achieved without the need for separate gusset structures. There is a disadvantage in that there is a strong deflection to the A-pillar of the longitudinal forces experienced in the case of a crash. Moreover, aluminium extrusion technology cannot be used for steel materials in motor vehicle construction so that the findings cannot be transferred to steel constructions.

In another similar support structure (GB-A-529,631), but the hollow sections of which are composed of half-shell shaped profiles, a single longitudinal member branches in the direction of the passenger compartment into a first hollow section going over into the lateral sill of the passenger compartment and into a second hollow section supported on other parts of the support structure. Therefor starting from the branching point the longitudinal member is extending as a single hollow member in the direction of the bumper. For this reason in the case of a crash the longitudinal member will be deformed over its whole length up to the branching point. No means are provided for a stepwise reduction of the impact energy.

EP 0 749892 B1 describes a method for producing structural members of a support structure of vehicles, which structural members with the use of interior high-pressure metal forming technology comprise at least two hollow sections which in some regions are hollow sections that are interconnected in a positive-locking way.

Depending on the locally occurring load, the longitudinal member of this support structure comprises the hollow sections which are interconnected in a positive-locking way, as described above, or comprises a single hollow section. The structural members can be made from steel or light metal. Interior high-pressure metal forming technology implies material doubling at the connection surfaces of the hollow sections which are interconnected in a positive-locking way, so that the design is heavy if steel materials are used. The printed publication does not deal with the force progression in the support structure in the case of a crash.

DE 4208700 C2 describes a lateral sill which comprises two hollow sections of rectangular cross section, which sill, in the direction of the front of the vehicle, bifurcates into an engine compartment brace, positioned across the direction of travel, and into a bulkhead member which also extends across the direction of travel.

A lateral frame, arranged at the height of the engine compartment, is supported by the engine compartment brace and the bulkhead crossmember. In the case of a load in longitudinal direction of the vehicle as a result of a crash, said lateral frame ensures a lead-in of forces by deflecting the longitudinal forces to the lateral sill. Materials other than aluminium can be used. This design, too, is associated with the disadvantage of being heavy, in particular if steel materials are used, since among other things doubling of materials has to be accepted in the region of the lateral sill.

Finally, WO 92/11159 describes a rear panel of a vehicle body comprising two crossmembers, wherein each of the ends of the lower crossmember, which are bent in longitudinal direction of the vehicle, is connected to an impact absorber which forms the rear end of a longitudinal member. Apparently this is a longitudinal member which comprises a single hollow section.

Consequently, the crash energy introduced into the longitudinal member during impact from the rear is evenly absorbed along the entire length of the longitudinal member or transferred to the passenger compartment since no additional strengtheners of the design are provided to protect said passenger compartment.

It is thus the object of the present invention to provide a support structure for vehicles, of the type mentioned in the introduction, which support structure, with the use of high-strength steel materials with a light overall weight and a small number of components, provides improved crash behaviour.

SUMMARY OF THE INVENTION

This object is met by a support structure of the type mentioned in the introduction in that exactly only one of the at least two hollow sections of the longitudinal member continues in the shape of a single hollow section in the direction of the bumper. As a result of continuing the longitudinal member in the direction of the bumper, there is no need for an impact absorber which would otherwise commonly be used since it has become an integral part of the longitudinal member. At the face of is single hollow section, the longitudinal member can be directly connected to the bumper by way of a flange, an arrangement which reduces the number of components required and thus also the overall weight. A crash with low-speed impact results in targeted deformation of the single hollow section, which as part of the repair process can be exchanged in an economical way. in the case of a higher-speed impact, the more rigit part of the longitudinal member with its hollow sections that are connected to form a multi-chamber section to protect passengers comes into play.

According to one embodiment of the invention, the second hollow section of the longitudinal member is supported by the tunnel reinforcement of the support structure of the passenger compartment. Thus, the very considerable forces which occur during a crash are deflected to the support structure of the passenger compartment of the vehicle in the desired favourable way. Since, in addition, a strong force deflection, for example to a vertically arranged member, is avoided, and the sections support each other, the danger of deformation of the support structure in the case of a crash is reduced.

A further embodiment of the invention provides for the parallel hollow sections to be integrally interconnected. This can be the result of applying a welding method wherein the application of a line seam, e.g. by means of laser beam welding, has been shown to be particularly advantageous.

Welding takes place across the entire length of the longitudinal member. Furthermore, an advantageous embodiment of the invention provides for the weld seam to be a stepped weld seam. This thus makes possible flexible adaptation of the welding process to the manufacturing-technology requirements of the subsequent user.

For the purpose of reducing weight, material doubling between the two hollow sections of the longitudinal member which forms a multi-chamber section can be avoided in that the two hollow sections share a common dividing wall. From a design point of view this can be realised in that one of the two hollow sections, at the side facing the other hollow section, is clipped prior to the joining process, or in that instead of a closed hollow section, a U-section is used, to which a closed hollow section is joined only a short distance before the longitudinal member bifurcates. The use of a clipped hollow section or a U-section makes it possible to reduce weight while at the same time maintaining practically the same rigidity and support structure. Furthermore, a reduction in weight is achieved because it is no longer necessary to reinforce the lateral sills and the A-pillar.

The invention makes it possible to use various profile cross-sections, with polygonal, in particular rectangular, cross-sections being preferred. Depending on the lateral or vertical offset of the longitudinal member relative to the lateral sill and to the tunnel reinforcement of the passenger compartment, the hollow sections are arranged on top of each other or beside each other. If polygonal cross-sections are used, a transverse arrangement is also possible. It has been shown to be particularly advantageous if the hollow sections of a longitudinal member comprise different cross-sections.

This makes for a still more flexible adaptation to the design specifications of the user. Furthermore, in this way the resistance moment of the longitudinal member can be precisely set with a view to the desired crash characteristics of the support structure.

A resistance moment of the longitudinal member, which resistance moment gradually increases in the direction of the passenger compartment, results in increasing rigidity of the support structure in this direction. In the case of a crash, depending on the impact speed, this makes it possible to provide safe protection of the passengers and to minimise the subsequent repair costs. This can be implemented in three ways:

1. The cross-section of at least one of the hollow sections of the longitudinal member increases in the direction of the passenger compartment. The use of a conically-shaped hollow section is suited to achieving this effect.
2. The materials thickness of at least one of the hollow sections of the longitudinal member increases in the direction of the passenger compartment.
3. In at least one of the hollow sections, the quality of the steel used increases in the direction of the passenger compartment.

From the point of view of manufacturing technology, an increase in the materials thickness and quality of the steel can be realised by the use of tailored blanks for producing one or both hollow sections.

Finally, a particularly advantageous embodiment of the invention provides for at least one of the hollow sections to be made from a flexibly rolled sheet. In this way, a progressive change in materials strength can be achieved.

BRIEF DESCRIPTION OF THE DRAWINGS

Below, the invention is explained in more detail with reference to a drawing which shows one embodiment, as follows:

FIG. 8a-e cross-sections of longitudinal members according to FIG. 2, made from identical hollow sections with weld seams;

FIG. 9a-c cross-sections of longitudinal members according to FIG. 2, made from different hollow sections with weld seams;

DETAILED DESCRIPTION OF THE INVENTION

Figure 1:
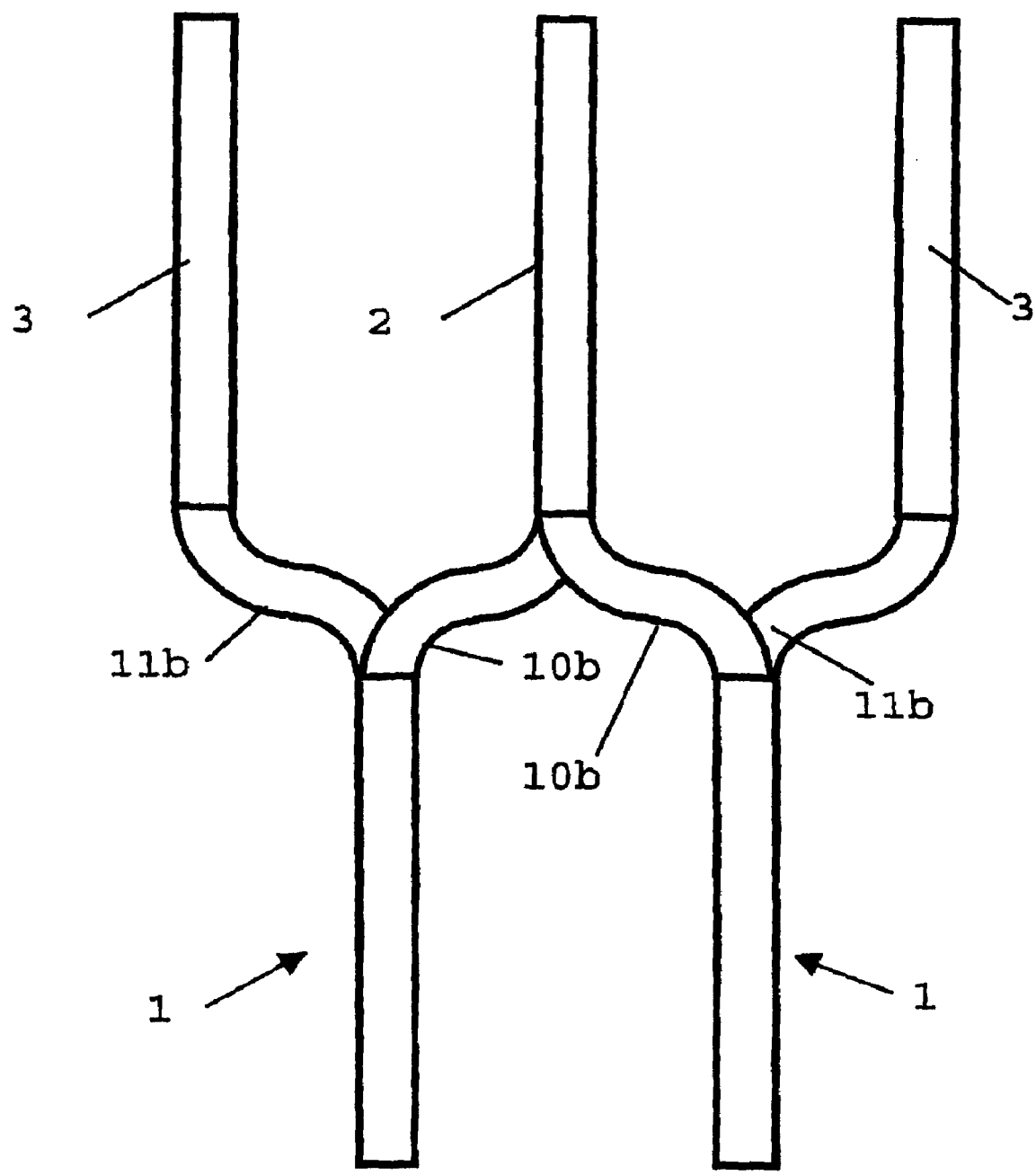
FIG. 1 a diagrammatic top view of a support structure for vehicles, comprising two longitudinal members, arranged one beside the other, and connected to the lateral sill and tunnel reinforcement of a passenger compartment.

The support structure of a vehicle, which support structure is diagrammatically shown in partial top view in FIG. 1, comprises two longitudinal members 1 of the front or rear part of a vehicle, a tunnel reinforcement 2 and two lateral sills 3 of the passenger compartment. The longitudinal members 1 are supported by the tunnel reinforcement 2 and the lateral sills 3 by way of bifurcating curved sections 10b, 11b, made of hollow sections 10, 11. In the design according to the invention, in the case of a crash, the tunnel reinforcement 2 is also used for deflecting longitudinal forces, which results in distribution of the forces to these three components of the support structure which extend in longitudinal direction of the vehicle in the region of the passenger compartment, and which results in partial load relief of the lateral sills.

Figure 2:
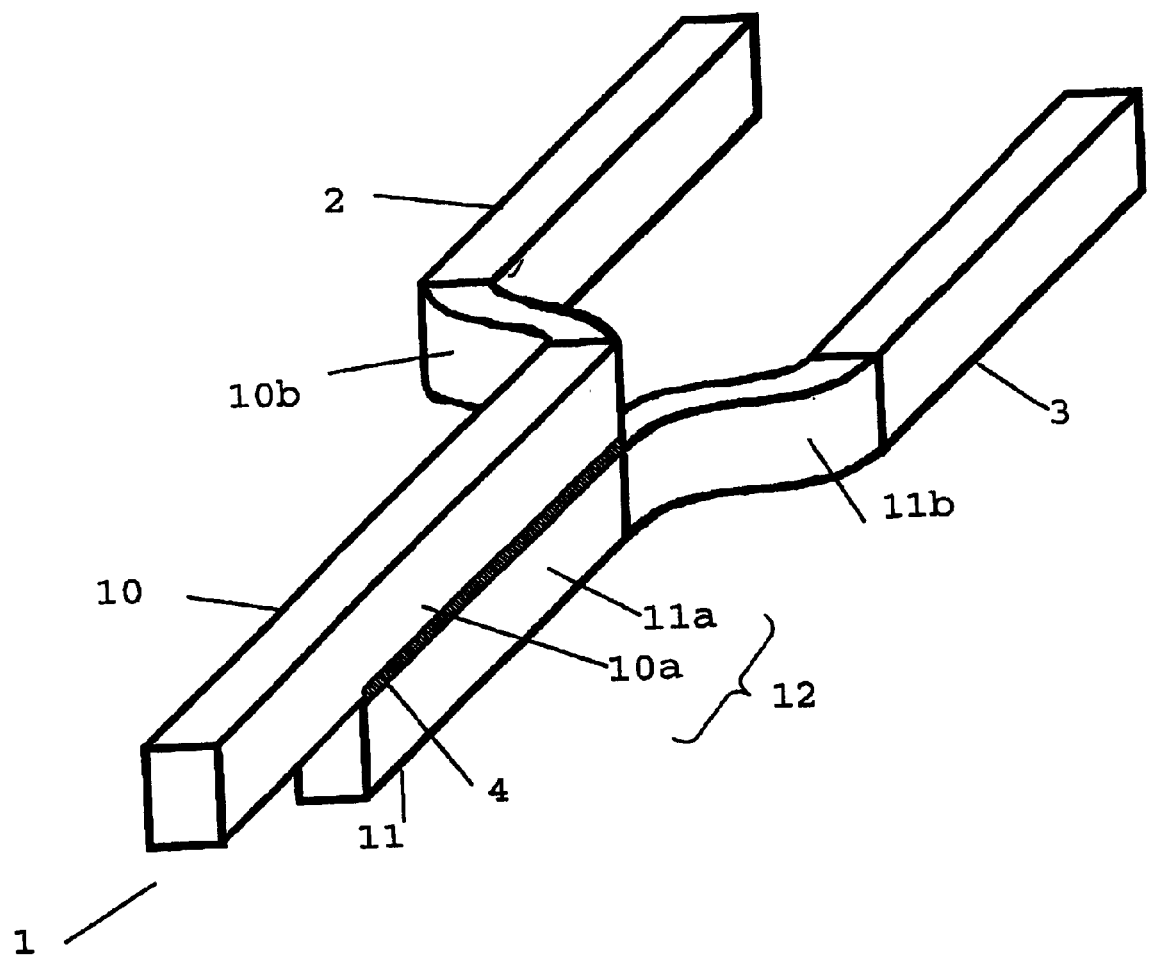
FIG. 2 a perspective view of part of the support structure of FIG. 1, namely a longitudinal member with connected lateral sills and tunnel reinforcement which are connected via sections that bifurcate.

As shown in the perspective view of FIG. 2, the longitudinal member 1 comprises two hollow sections 10, 11, one arranged on top of the other. These hollow sections 10, 11 comprise straight sections 10a, 11a which in the direction of the passenger compartments bifurcate into the two curved sections 10b, 11b. At the face ends, these sections 10b, 11b are connected to the tunnel reinforcement 2 and a lateral sill 3 of the support structure of the passenger compartment.

Figure 3:
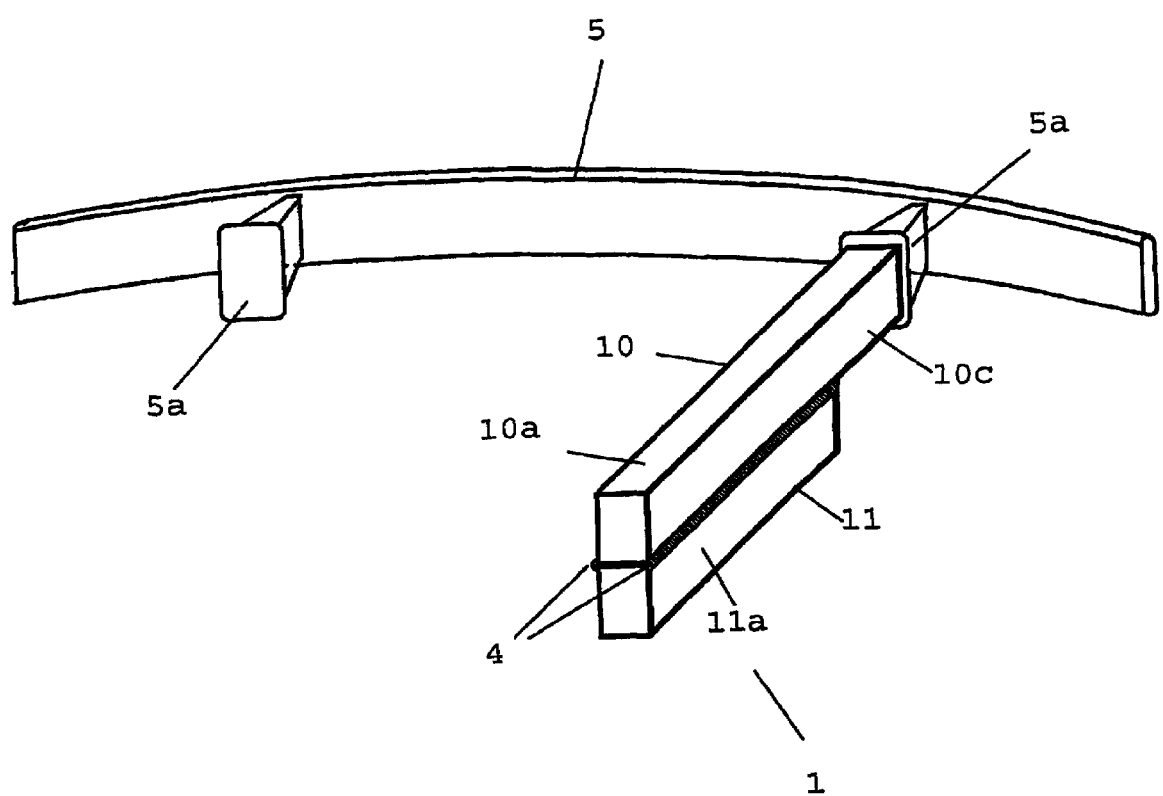
FIG. 3 a perspective view of the longitudinal member according to FIG. 2, without sections that bifurcate, with a single continuing hollow section and a bumper installed at its face.

As also shown in the perspective view in FIG. 3, only the hollow section 10 comprises a section 10c which continues in the direction of the bumper 5, wherein said continuous section 10c at the face is connected to a flange 5a of the bumper 5, which flange 5a is arranged in longitudinal direction of the vehicle. The single section 10c of the hollow section 10 can thus replace the impact absorber.

Figure 4A:
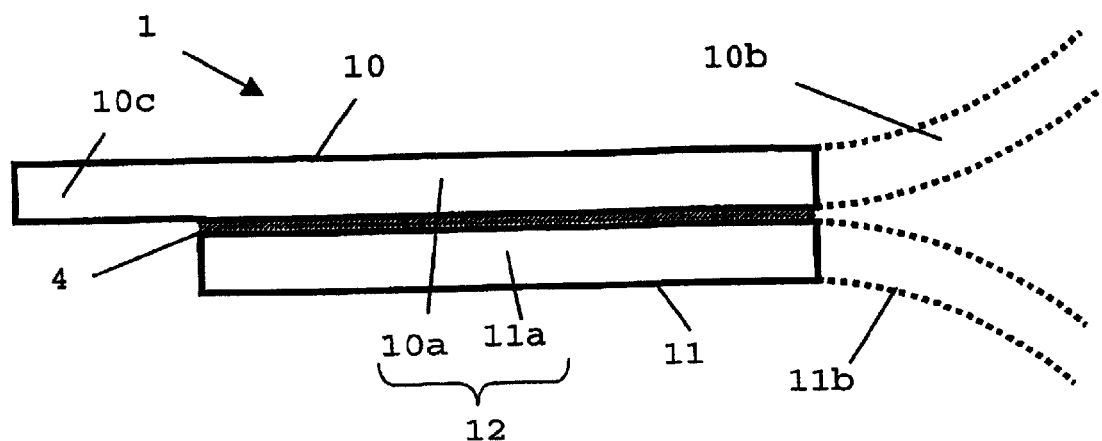
FIGS. 4a, b the longitudinal member according to FIG. 2 in lateral view with continuous weld seam and stepped weld seam.
Figure 4B:
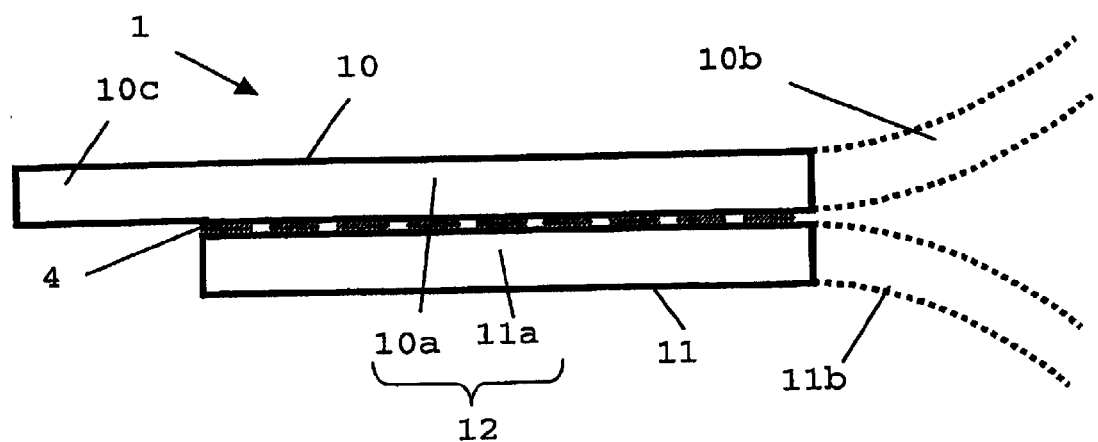

In their parallel sections 10a, 11a, both sides of the hollow sections are connected to a multi-chamber section 12 by means of weld seams 4. As shown in FIGS. 4a and 4b, a continuous weld seam 4 (FIG. 4a) or a stepped weld seam 4 (FIG. 4b) can be provided.

Figure 5:
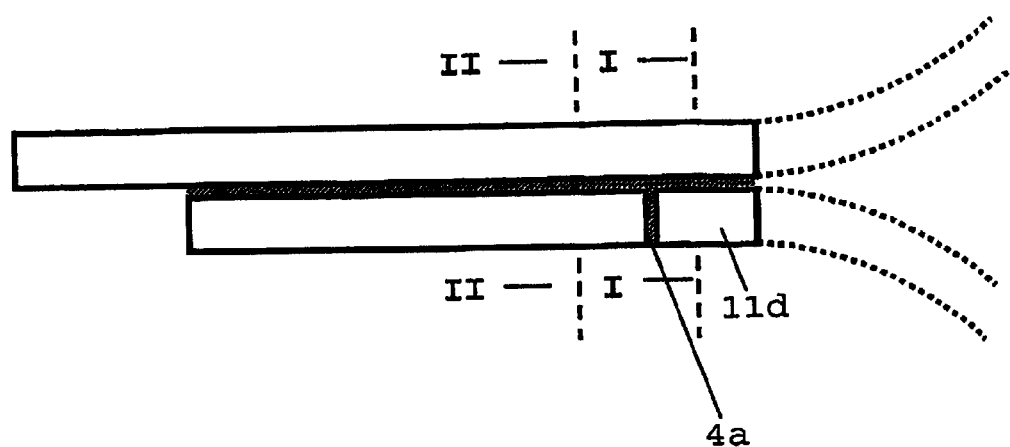
FIG. 5 a lateral view of a longitudinal member in the shape of a U-section.
Figure 6:
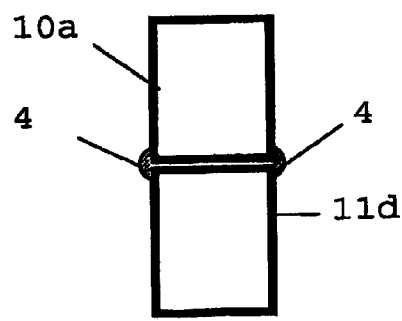
FIG. 6 a cross-section, along the line I-I in FIG. 5, of the longitudinal member according to FIG. 5
Figure 7:
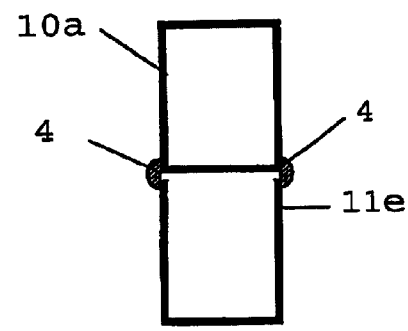
FIG. 7 a cross-section, along the line II-II in FIG. 5, of the longitudinal member according to FIG. 5

FIGS. 5 to 7 show the use of a U-section 11e instead of a closed hollow section along almost the entire length of the multi-chamber section 12. The U-section 11e is replaced by a closed hollow section 11d only a short distance before the bifurcation of the hollow sections 10, 11. The connection between the U-section 11e and the hollow section 11d is realised by a further weld seam 4a.

As shown in FIGS. 8a to 8e, longitudinal members can be composed of hollow sections of various cross-sectional geometries, with the aim of accommodating them in a spatially optimal way. By means of the longitudinal members shown in cross-section in FIGS. 9a to 9c, which longitudinal members are composed of various hollow sections, the flexibility of the spatial arrangement of the longitudinal member can additionally be increased.

Figure 10:
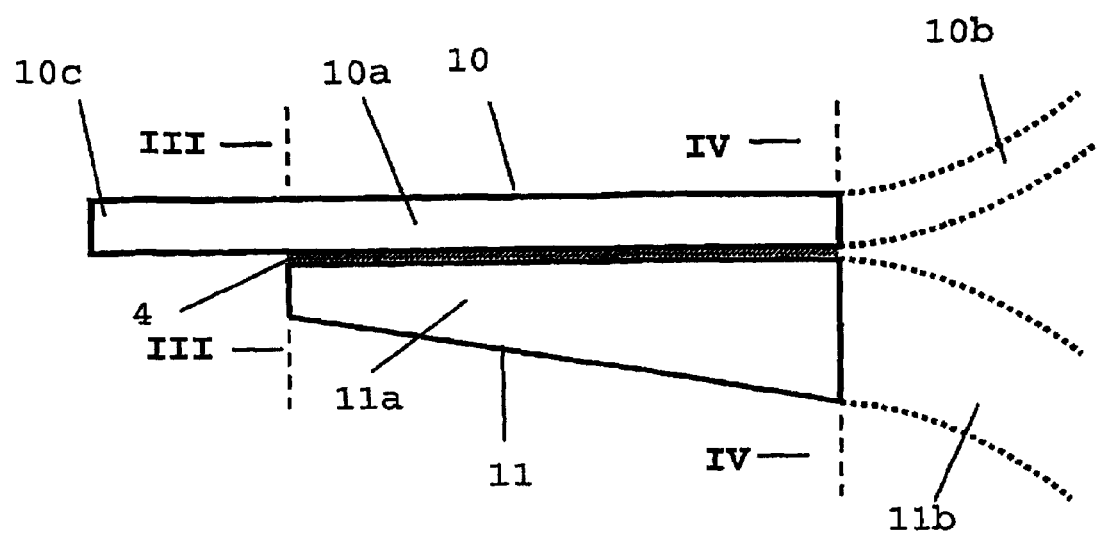
FIG. 10 a longitudinal member comprising a profile cross-section which progressively increases in the direction of the passenger compartment.
Figure 11:
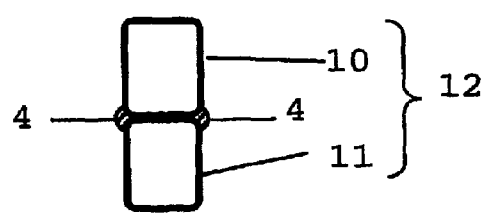
FIG. 11 a cross-section, along the line III-III in FIG. 10, of the longitudinal member according to FIG. 10.
Figure 12:
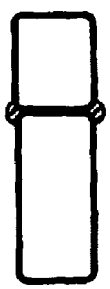
FIG. 12 a cross-section, along the line IV-IV in FIG. 10, of the longitudinal member according to FIG. 10.
Figure 13:
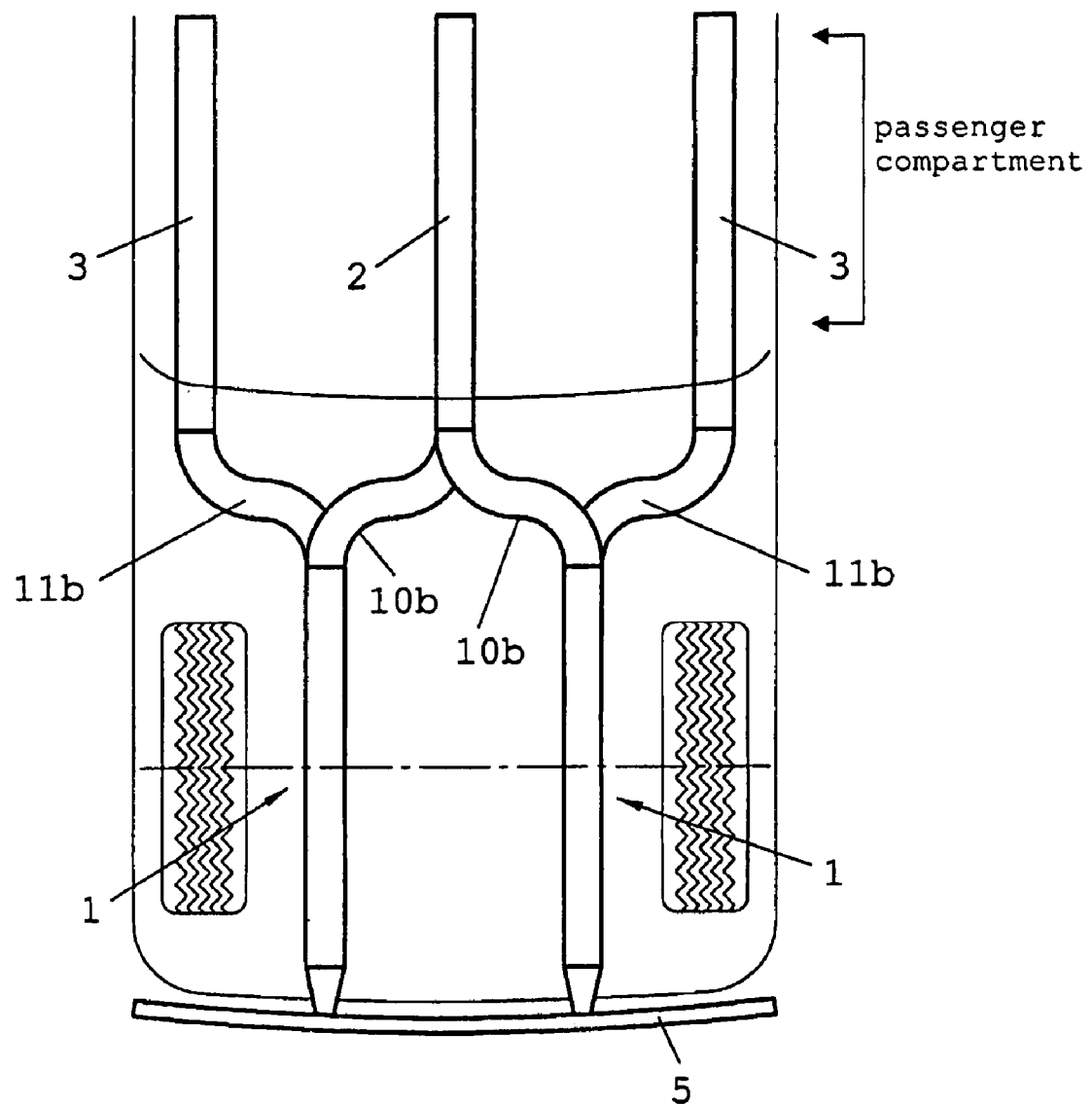
FIG. 13 A top view of the support structure further defining the passenger compartment.

In the longitudinal member shown in FIG. 10, the hollow section 11 comprises a profile cross-section which gradually increases in the direction of the passenger compartment. Consequently, the resistance moment of the longitudinal member 1 gradually increases in this direction, which results in the desired favourable crash characteristics of the support structure. FIGS. 11 and 12 show the cross-section of the multi-chamber section 12 at the end of the multi-chamber section which faces away from the passenger compartment (FIG. 11), as well as directly at the point of bifurcation of the hollow sections (FIG. 12).

The invention claimed is:

1. A support structure for vehicles, made from steel sections, comprising a longitudinal member made from at least two hollow sections which are interconnected in parallel, wherein said hollow sections, in a front of the support structure of a passenger compartment, bifurcate into a first hollow section supported by a lateral sill of the support structure of the passenger compartment, and a second hollow section supported by other parts of the support structure of the passenger compartment, wherein only one of the at least two hollow sections of the longitudinal member continues in the shape of a single hollow section in the direction of a bumper.

2. The support structure according to claim 1, wherein the second hollow section is supported by a tunnel reinforcement of the support structure.

3. The support structure according to claim 1, wherein the hollow sections are integrally interconnected in longitudinal direction.

4. The support structure according to claim 3, wherein the integral connection is achieved by means of a weld seam.

5. The support structure according to claim 4, wherein the weld seam is a stepped weld seam.

6. The support structure according to claim 4, wherein one of the two hollow sections, in the region of the weld seam, is partially designed as a U-section.

7. The support structure according to claim 1, wherein the hollow sections comprise a polygonal cross-section, wherein the two hollow sections rest against each other on a flat side.

8. The support structure according to claim 1, wherein the longitudinal member is comprised of hollow sections of different cross-sections.

9. The support structure according to claim 1, wherein the cross-section of at least one of the hollow sections changes in longitudinal direction.

10. The support structure according to claim 1, wherein at least one of the hollow sections is made from a tailored blank.

11. The support structure according to claim 9, wherein the hollow sections comprise various steel grades.

12. The support structure according to claim 9, wherein the materials of the hollow sections vary.

13. The support structure according to claim 1, wherein at least one of the hollow sections is made from a flexibly rolled sheet.

* * * * *